UNITED STATES PATENT OFFICE.

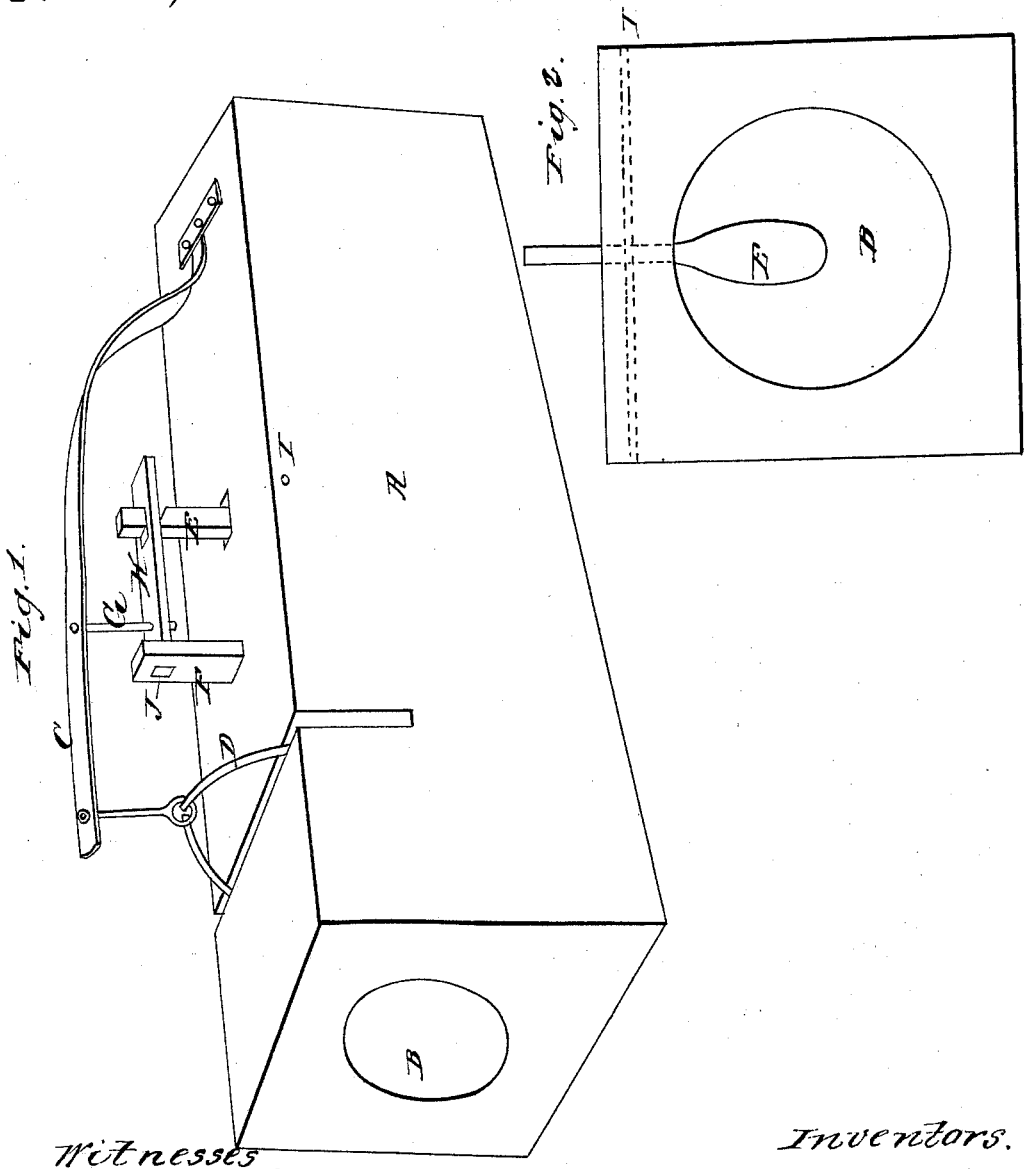

AUGUSTUS J. EDDY, OF WINNESHEIK COUNTY, AND JOHN B. WILBER, OF HOWARD COUNTY, IOWA.

IMPROVEMENT IN ANIMAL-TRAPS.

Specification forming part of Letters Patent No. 45,393, dated December 13, 1864.

*To all whom it may concern:*

Be it known that we, AUGUSTUS J. EDDY, of the county of Winnesheik and State of Iowa, and JOHN B. WILBER, of the county of Howard and State of Iowa, have invented a new and Improved Trap for Catching Pocket-Gophers; and we do hereby declare that the following is a full, clear, and exact description of the construction and operation of the same, reference being had to the annexed drawings, making a part of this specification, in which—

Figure 1 is a perspective view; Fig. 2, a detached part.

A piece of scantling about one foot long and four or five inches square, A, Fig. 1, is bored out longitudinally through the center large enough to admit the body of a pocket-gopher. This hole is shown at B, Fig. 1. On the top of the trap is fastened the steel spring C, the front end of which is attached to the garrote D, which garrote extends down into and around the hole B, Fig. 1, as in the common mouse-trap. A mortise is made in the top of the trap, into which is inserted the trigger E, which extends down into the hole or inside of the trap and plays loosely on a pivot, I, some two or three inches forward of the trigger, and fastened into the top of the trap is a pin of metal, F, extending up the same height as the trigger E, in the end of which pin of metal is a small slot or mortise, J. Into the steel spring C is inserted a wire, G, the lower end of which is fastened to the lever H. This wire G, with its lever attached, plays or swings loosely. On the end of the lever H, near which end the wire G is fastened, is a tenon or point, which, when the trap is set, is inserted into the slot J in the pin of metal F, while the other end of said lever has a slot which is slipped down over the end of the trigger E and into a notch, K, in said trigger. The wire G being fastened to the lever H, close to the pin of metal F, it takes the greater part of the strain of the spring off the trigger E, and makes the trap more sensitive and certain in its operation.

The pocket-gopher is very destructive to root and other crops, burrowing in the ground, cutting off the roots of fruit trees, garden vegetables, or anything eatable in its way. It is scarcely ever seen above ground, and its presence is only detected by small mounds, which it throws up at the end of its burrow or hole, commonly called "gopher-hills." If one of these hills be removed and the burrow be left open, as soon as the gopher discovers it he comes with his pockets full of dirt to fill up the entrance. Now, if this trap is placed in the entrance, the inside of the trap being about the size of the burrow, and making a continuation of it, the gopher rushes up to fill up the entrance, strikes the trigger, and is caught.

What we claim as our invention, and desire to secure by Letters Patent, is—

The combination of the spring C, wire G, lever H, and trigger E, constructed and operated as described.

AUGUSTUS J. EDDY.
JOHN B. WILBER.

Witnesses:
HENRY KELLY,
J. A. BEEBE.